March 29, 1966   F. MANARESI   3,242,575
LYOPHILIZATION APPARATUS
Filed Aug. 8, 1961
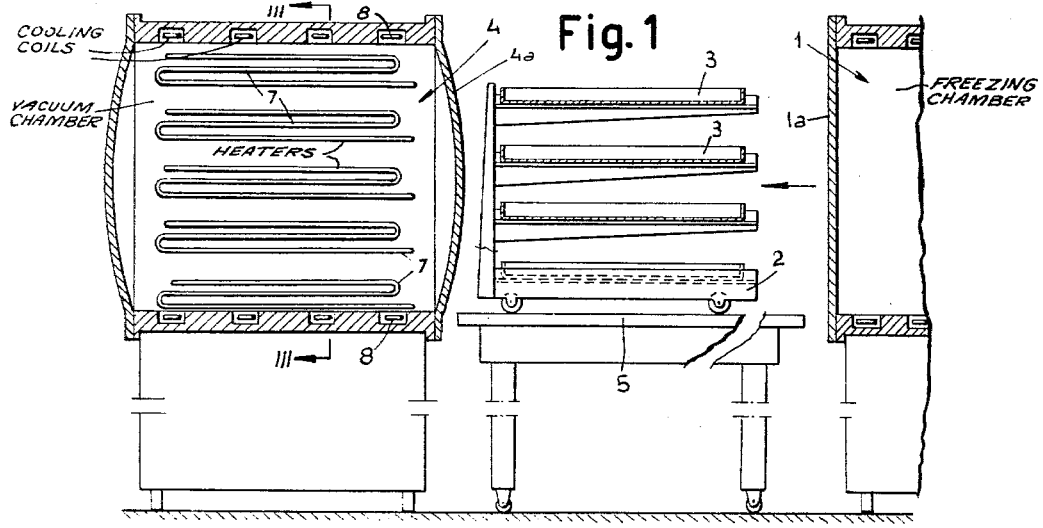
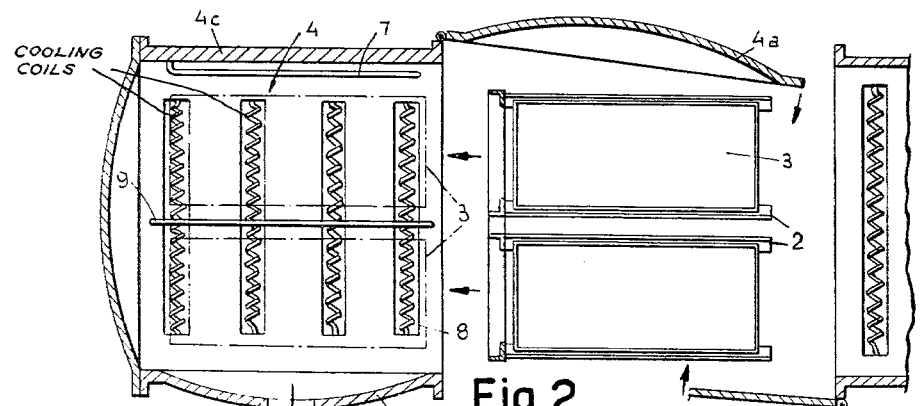
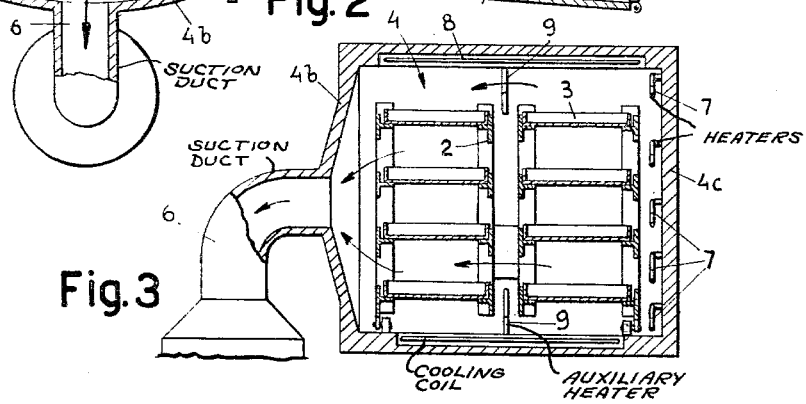
INVENTOR:
FRANCESCO MANARESI

United States Patent Office 3,242,575
Patented Mar. 29, 1966

3,242,575
LYOPHILIZATION APPARATUS
Francesco Manaresi, Florence, Italy; Alessandra Manaresi, Giuliana Manaresi, Adriana Manaresi, and Ida Paolia Manaresi, heirs of said Francesco Manaresi, deceased
Filed Aug. 8, 1961, Ser. No. 130,124
Claims priority, application Italy, Nov. 5, 1960, 19,202/60
7 Claims. (Cl. 34—66)

This invention relates to the lyophilization of products having a high moisture content, and in particular, but not exclusively to the lyophilization of coffee infusions.

In the lyophilization of a product by the present invention the moisture content is removed by sublimation from ice to vapour without there being a liquid stage. In the case of coffee the resultant product is rapidly soluble for the preparation of coffee beverages or the like.

According to the invention there is provided apparatus for lyophilizing a mass of material within a chamber connected to a vacuum source, wherein lyophilization is effected initially in zones more distant from the vacuum source intake and is subsequently effected in zones which are closer to said intake.

The invention also provides a lyophilization chamber comprising an intake to a vacuum source for extracting the liberated vapour, and heating means, wherein at least the main part of said heating means are arranged in the chamber in parts remote from said intake.

Such an arrangement ensures the formation of vapours in the zones which are initially heated and which then undergo the lyophilization process, while the vapours thus generated are not condensed during movement through the chamber towards the intake across zones where there is little or no generation of vapour during the initial heating stage.

The main part of said heating means, may be operative initially, then auxiliary heating means also, and, finally the auxiliary heating means alone may be operative when liberation of vapours in the zones more distant from the vacuum source intake has ceased.

One construction of a lyophilization plant in accordance with the present invention will now be described, by way of example only, with reference to the accompanying drawings, in which:

FIG. 1 is a diagrammatic side elevational view of the lyophilization plant, partly shown in section;

FIG. 2 is a plan sectional view of the apparatus shown in FIG. 1;

FIG. 3 is a section taken along the line III—III of FIG. 1.

Referring now to the accompanying drawing, this shows a refrigeration chamber 1, which is capable of cooling the coffee solution to be lyophilized, for instance down to a temperature of $-50°$ C. The chamber 1 is designed to accommodate a slidable structure 2 which supports a plurality of trays 3 which are relatively shallow and are arranged one above the other. The structure 2 may advantageously have a gap in the central zone, for a purpose to be described hereinafter.

The structure 2 with the trays 3 is capable of being inserted in the refrigeration chamber 1 and transferred therefrom to a lyophilization chamber 4, by means of a trolley 5. The lyophilization chamber 4 is provided with an access door 4a opposite the access door 1a of the refrigeration chamber 1. In a side wall 4b of the chamber 4, a suction duct 6 is provided which leads to a vacuum pump (not shown), the pump being capable of producing a high vacuum in the chamber 4 and extracting the vapours resulting from the lyophilization process. On a wall 4c opposite the wall 4b are arranged heating means 7 in the form of serpentine elements or other heat radiating means. The chamber 4 is also provided with cooling means 8 by which the chamber 4, when it is at ambient pressure can be cooled to a temperature of as low as $-20°$ C. Additional auxiliary heating means 9 (FIGS. 2 and 3) are provided intermediate the walls 4b and 4c lying in the upper and lower parts of the chamber 4 in the region where the gap is provided in the central zone of the structure 2 referred to above.

In use the structure 2 is inserted in the refrigeration chamber 1 and brought to a temperature, for instance down to $-50°$ C., but at least such that the trays 3 and the material therein contained assume a temperature of approximately $-40°$ C. Simultaneously, the chamber 4 is cooled by the cooling means 8, for instance to a temperature of $-10°$ C. or $-20°$ C., the pressure being maintained at ambient presure. When the desired temperature is attained in chamber 4, the structure 2 with the tanks 3 is transferred from the refrigeration chamber 1 to the chamber 4, for instance by transport on the trolley 5.

With the chamber 4 closed the low temperature is maintained and the vacuum pump is started to reduce the internal pressure substantially to zero. When this operation is completed, heating is started using only the side heating means 7 to effect lyophilization of that part of the material in the tanks 3, which is near to the wall 4c, where the heating means 7 is located, whilst the material in the tanks 3 nearer to the passage 6 remains practically solid but not heated. Consequently, the vapours resulting from the lyophilization process adjacent the heating means 7, are not condensed during movement through the chamber 4 towards the passage 6, owing to the practically complete absence of vapours in the region traversed. As the lyophilization process in the zone next to the heaters 7 is completed, the lyophilization of the adjacent zones is started and subsequently completed.

In order to accelerate the lyophilization process, a certain time after the start, for instance after two thirds of the overall time required for the lyophilization and when the lyophilization of the material in the trays 3 next to the heaters 7 is completed, heating is effected by the auxiliary intermediate heaters 9; at the same time some of the heaters 7 may be switched-off and eventually all the heaters 7 switched-off. Thus, the lyophilization of the material in the trays 3 more distant from the heaters 7 is accelerated, and the lyophilization process completed for the material in these trays.

This arrangement is designed to avoid any formation of liquid in the material submitted to lyophilization and which is harmful to the material, whose correct lyophilization must exclude any liquid stage.

What is claimed is:

1. A lyophilization apparatus comprising refrigeration means for freezing a mass of material to be lyophilized, a refrigerated vacuum chamber having spaced end walls, means for transferring the frozen mass of material from said refrigeration means to said chamber, a suction duct connected to one of said end walls, a first source of heat positioned in proximity to the other of said end walls for applying heat to a portion of said material remote from said suction duct, a second source of heat in said chamber spaced from the first source and independent of the first source of heat so that the first source may be activated while the second source is deactivated and vice versa, said second source being located intermediate said end walls and closer to said one end wall of the chamber than the first source, and means for controlling the sources of heat independently of each other so that vapors arising from heated portions of said mass and being drawn off through said suction duct will always remain below saturation, whereby condensation of liquid in said chamber from said vapors is prevented.

2. A lyophilization apparatus comprising a refrigerated vacuum chamber having first and second spaced confronting walls, a suction duct opening in the first wall for maintaining a vacuum in said chamber, first heating means on the second wall, and second heating means in the chamber located intermediate said walls, said first and second heating means being independent of each other so that each heating means may be activated and deactivated independently of the other.

3. A lyophilization apparatus comprising a vacuum chamber, refrigeration means in said chamber, said chamber having first and second spaced confronting walls, a suction duct connected to an opening in the first wall for maintaining a vacuum within said chamber, first heating means on the second wall, second heating means in the chamber located intermediate said walls, said first and second heating means being independent of each other so that one heating means may be activated to vaporize frozen liquid in one portion of a frozen mass of material in the chamber while the second heating means is deactivated, so that the second heating means may be activated to vaporize frozen liquid from another portion of the frozen mass while the first heating means is deactivated after all liquid is vaporized from said one portion of the frozen mass, and means for controlling the activation and deactivation of the first and second heating means and said refrigeration means independently of each other.

4. A lyophilization apparatus comprising a vacuum chamber, refrigeration means in said chamber, said chamber having first and second spaced confronting walls, said first wall having an opening formed therein, a suction duct connected to said opening in the first wall for maintaining a vacuum within said chamber, first heating means on the second wall, second heating means in the chamber located intermediate said walls, said first and second heating means being independent of each other so that one heating means may be activated to vaporize frozen liquid in one portion of a frozen mass of material in the chamber while the second heating means is deactivated, so that the second heating means may be activated to vaporize frozen liquid from another portion of the frozen mass spaced from said one portion while the first heating means is deactivated after all liquid is vaporized from said one portion of the frozen mass, means for controlling the activation and deactivation of the first and second heating means and said refrigeration means independently of each other, a refrigeration chamber adjacent to the vacuum chamber for initially freezing said mass, tray means for containing said material while being frozen in said refrigeration chamber and while being lyophilized in said vacuum chamber, and means for transporting said tray means from the refrigeration chamber into said vacuum chamber while the frozen mass remains in a solid frozen state.

5. A lyophilization apparatus comprising a vacuum chamber, refrigeration means in said chamber, said chamber having first and second spaced confronting walls, said first wall having an opening formed therein a suction duct connected to said opening in the first wall for maintaining a vacuum within said chamber, first heating means on the second wall, second heating means located in said chamber intermediate said first and second walls, said first and second heating means being independent of each other so that one heating means may be activated to vaporize frozen liquid in one portion of a frozen mass of material in the chamber nearer to said second wall than to said first wall while the second heating means is deactivated, and the second heating means may be activated to vaporize frozen liquid from another portion of the frozen mass nearer to said first wall than said one portion while the first heating means is deactivated after all liquid is vaporized from said one portion of the frozen mass, means for controlling the activation and deactivation of the first and second heating means and said refrigeration means independently of each other, a refrigeration chamber adjacent to the vacuum chamber for initially freezing said mass of material, a plurality of tray member for retaining said material during the freezing and lyophilization thereof, supporting means holding said tray members in vertically aligned relationship in a plurality of horizontally spaced series both in said refrigeration chamber and in said vacuum chamber, said second heating means including at least a portion which is positioned intermediate two adjacent ones of said vertically aligned tray members when said supporting means is in said vacuum chamber, and trolley means for transporting said supporting means from said refrigeration chamber to said vacuum chamber.

6. A lyophilization apparatus comprising a vacuum chamber, refrigeration means in said chamber, said vacuum chamber having first and second horizontally spaced opposing walls, a suction duct communicating through said first wall with the interior of said vacuum chamber, first heating means located within said vacuum chamber and mounted on said second wall, second heating means located within said chamber intermediate said first and second walls, said first and second heating means being independent of each other so that said first heating means may be activated to vaporize frozen liquid in one portion of a frozen mass of material in said vacuum chamber which is closer to said second wall than to said first wall while the second heating means is deactivated, whereby said second heating means may be activated to vaporize frozen liquid from another portion of the frozen mass more remote from said first heating means than said one portion of said mass while the first heating means is deactivated after all liquid is vaporized from said one portion of the frozen mass, means for controlling the activation and deactivation of the first and second heating means and said refrigeration means independently of each other, a plurality of tray members for retaining said material in its frozen state while during lyophilization thereof in said vacuum chamber, and supporting means for holding said tray members in a plurality of stacked arrays with at least a portion of said stacked arrays disposed at opposite sides of at least a portion of said second heating means.

7. A lyophilization apparatus, comprising a refrigerated vacuum chamber having two horizontally spaced sides, a source of vacuum applied to one side of said chamber, a first source of heat in said chamber remote from said one side of the chamber for applying heat to a portion of said material remote from said source of vacuum, a second source of heat in said chamber independent from the first source of heat so that the first source may be activated while the second source is deactivated and vice versa, said second source being located intermediate said two sides closer to said one side of the chamber than said first source, and means for controlling said first and second sources of heat independently of each other so that vapors arising from heated portions of said mass and being drawn off by said source of vacuum always remain below saturation, whereby condensation of liquid in said chamber from said vapors is prevented.

References Cited by the Examiner

UNITED STATES PATENTS

| | | | |
|---|---|---|---|
| 1,418,638 | 6/1922 | Frankel et al. | 34—92 |
| 1,970,956 | 8/1934 | Elser | 34—5 |
| 2,453,033 | 11/1948 | Patterson | 34—5 |
| 2,483,254 | 9/1949 | Almy | 34—5 |
| 2,564,475 | 8/1951 | Fischer | 34—5 |
| 2,602,825 | 7/1952 | Flosdorf | 34—5 |

WILLIAM F. O'DEA, *Acting Primary Examiner.*
NORMAN YUDKOFF, *Examiner.*